US007254725B2

(12) United States Patent
Förstl

(10) Patent No.: US 7,254,725 B2
(45) Date of Patent: Aug. 7, 2007

(54) METHOD FOR THE POWER-SAVING CONTROL OF A RECEIVING DEVICE, IN PARTICULAR FOR AN ACCESS CONTROL SYSTEM FOR AN AUTOMOBILE, AND A CORRESPONDING RECEIVING DEVICE

(75) Inventor: Bernhard Förstl, Ihrlerstein (DE)

(73) Assignee: Siemens Aktiengesellschaft, Munich (DE)

( * ) Notice: Subject to any disclaimer, the term of this patent is extended or adjusted under 35 U.S.C. 154(b) by 695 days.

(21) Appl. No.: 10/652,444

(22) Filed: Aug. 29, 2003

(65) Prior Publication Data

US 2005/0277392 A1 Dec. 15, 2005

(30) Foreign Application Priority Data

Aug. 30, 2002 (DE) ................................ 102 40 137

(51) Int. Cl.
*G06F 1/32* (2006.01)

(52) U.S. Cl. ....................... 713/320; 455/574; 340/825

(58) Field of Classification Search ................ 713/320; 455/574; 340/825
See application file for complete search history.

(56) References Cited

U.S. PATENT DOCUMENTS

| | | | | |
|---|---|---|---|---|
| 4,961,073 | A * | 10/1990 | Drapac et al. | 340/7.34 |
| 5,198,644 | A * | 3/1993 | Pfeiffer et al. | 235/383 |
| 5,299,228 | A * | 3/1994 | Hall | 370/335 |
| 5,809,142 | A | 9/1998 | Hurta et al. | 380/24 |
| 5,838,257 | A * | 11/1998 | Lambropoulos | 340/5.61 |
| 6,037,675 | A * | 3/2000 | Yoshida et al. | 307/10.2 |
| 6,089,456 | A * | 7/2000 | Walsh et al. | 235/472.01 |
| 6,236,850 | B1 * | 5/2001 | Desai | 455/343.2 |
| 6,311,079 | B1 * | 10/2001 | Alton et al. | 455/567 |
| 6,754,513 | B1 | 6/2004 | Ilg | 455/574 |
| 2001/0048363 | A1 * | 12/2001 | Trosper | 340/571 |

FOREIGN PATENT DOCUMENTS

| | | |
|---|---|---|
| CA | 2262034 | 2/1999 |
| DE | 19832203 | 1/2000 |
| DE | 19939365 | 3/2000 |
| WO | 9325987 | 12/1993 |
| WO | 9621285 | 7/1996 |

* cited by examiner

*Primary Examiner*—Chun Cao
*Assistant Examiner*—Vincent Tran
(74) *Attorney, Agent, or Firm*—Baker Botts L.L.P.

(57) ABSTRACT

A method for the power-saving control of a receiving device 1, in particular for an access control system for an automobile, is disclosed wherein in an inquiry mode it is determined in response to a control signal $S_a$ whether a receive signal $S_r$ to be processed is supplied by a receiver unit 7 of the receiving device 1 to a controller 3 of the receiving device 1. The receiver unit 7 and the controller 3 are, in response to the control signal $S_a$, simultaneously switched from a power-saving sleep mode in each case to an active mode in each case.

7 Claims, 3 Drawing Sheets

METHOD FOR THE POWER-SAVING CONTROL OF A RECEIVING DEVICE, IN PARTICULAR FOR AN ACCESS CONTROL SYSTEM FOR AN AUTOMOBILE, AND A CORRESPONDING RECEIVING DEVICE

PRIORITY

This application claims foreign priority of the German application DE 10240137.3 filed on Aug. 30, 2002.

BACKGROUND OF THE INVENTION

In the case of access control systems such as those used, for example, in automotive engineering, it is necessary to design the systems in such a way that their power consumption is as low as possible. This applies both to a battery-operated mobile key which is carried by the driver and to the base station located in the automobile which is powered by the automobile's battery. The aforesaid components of an access control system generally have a microprocessor or controller. In order to save energy, such controllers are characterized in that they can be set to optionally different power-saving modes, in particular to a power-saving sleep mode in which even the clock unit of the controller is switched off (stop mode), and a quasi sleep mode in which, while the clock unit remains active, other internal and optionally external components of the controller are switched off or are run at low speed (low clock frequency) (pseudo stop mode).

Various systems in which this power-saving facility of controllers is used are known, for example, from patent application nos. DE-A-199 39 365 and WO-A-93/25987.

In order to save energy, it is also known for use to be made of a combination of a more powerful main controller having a correspondingly high power input in active mode and a less powerful pre-controller having a relatively low power input in active mode. The pre-controller is in this case kept constantly in active mode or pseudo stop mode so that it can perform any functions to be handled without any substantial time delay. For example, it is necessary in certain access control systems for the base station in the automobile to check periodically whether a mobile key has been activated in the area around the vehicle and whether in response to this transmit signal the vehicle's locking must be cancelled. To do this, the pre-controller can periodically activate the receiving unit of the base station, for example by applying the power supply voltage, and after waiting for the activation period (settling of filters, amplifiers and such like), sample the signal supplied by the receiving unit. If the pre-controller detects a received signal which has to be evaluated, for example regarding access authorization, then it can activate the main controller. The main controller, which is normally found in stop mode, has to be woken up for this purpose by means of an appropriate signal.

A base station of this type has the advantage, compared with a base station having only one correspondingly powerful main controller, of having a lower overall (mean) power input and a lower mean current input.

However, a disadvantage in a base station fashioned in this way is the relatively long response time, which is made up of the activation time in respect of the receiving unit and the activation time in respect of the main controller. Furthermore, the pre-controller means that there is an additional circuit-engineering outlay.

SUMMARY OF THE INVENTION

Taking this prior art as a starting point, the object of the invention is to create a method for the power-saving control of a receiving device, in particular for an access control system for an automobile, said method making do with only one controller and enabling a low response time coupled with a similarly low mean power input. A further object of the invention is to create a receiving device of this type and software or firmware for such a receiving device.

This object can be achieved by a method for the power-saving control of a receiving device, in particular for an access control system for an automobile, comprising the steps:

a) ascertaining in an inquiry mode in response to a control signal whether a receive signal to be processed is supplied by a receiver unit of the receiving device to a controller of the receiving device, b) switching the receiver unit and the controller, in response to the control signal, simultaneously from a power-saving sleep mode in each case to an active mode in each case.

The controller can be, after expiration of the controller activation time, switched to a power-saving quasi sleep mode with a steady-state oscillator, until the receiver-unit activation time has expired and the receiver unit is supplying stable data. The controller, after expiration of the receiver-unit activation time during a predetermined time span, which corresponds to a specified number of bits of a possible receive signal, may sample the signal supplied by the receiver unit, preferably at equidistant intervals, wherein in order to record a sampled value, the controller is switched to the active mode and after termination of each sampling operation is returned to the quasi sleep mode. The control signal can be fed to the controller and the receiver unit by means of an external circuit. The control signal can be fed to the controller and the receiver unit by means of a controller-internal circuit or as a result of a controller-internal event and the power-saving sleep mode of the controller is a quasi sleep mode of the controller with a steady-state oscillator.

The object can also be achieved by a receiving device, in particular for an access control system for an automobile, comprising a controller and a receiver unit which supplies a receive signal to the controller, wherein the controller is capable to determine in an inquiry mode in response to a control signal whether the receiver unit is supplying a receive signal to be processed, and switching means in the receiver unit and the controller for, in response to the control signal, simultaneously switching from a power-saving mode in each case to an active mode in each case.

The controller may comprise software or firmware for ascertaining in an inquiry mode in response to a control signal whether a receive signal to be processed is supplied by a receiver unit of the receiving device to a controller of the receiving device, and for switching the receiver unit and the controller, in response to the control signal, simultaneously from a power-saving sleep mode in each case to an active mode in each case.

The method can furthermore be implemented in a computer program product having program code means which control a receiving device, after loading in a memory of the controller and/or can be stored in a computer-readable data media for control of a receiving device, after loading in a memory of the controller.

According to the invention, in a first embodiment both the (single) controller and the receiving unit of the receiving device are woken up from a sleep mode (stop mode) by means of a control signal. It is necessary to wait for the clock unit to power up and settle before the active mode of the controller is reached. The receiving unit is in the active mode when all filters, amplifiers and such like have settled after the power supply voltage has been applied and valid data is being supplied as a result. The time span necessary for this is also designated the "time to good data". The control signal can be generated in this embodiment by an external timer unit which for example periodically generates a control signal and/or a control signal which has at periodic intervals a corresponding wake-up pulse or activation pulse.

This embodiment has the advantage that the controller can be brought to stop mode in inactive phases, in which mode the current input or power input is the minimum possible.

The activation signal can, however, also be generated by a controller-internal timer unit. In this case, the controller feeds the necessary activation signal to the receiver unit. This embodiment has the advantage that no external timer unit is necessary and consequently the circuit-engineering outlay is lower than in the first-mentioned alternative.

According to a further embodiment, the controller is set, after the active mode has been reached, to a quasi sleep mode (pseudo stop mode) until the receiver unit has reached its active mode. This is because the activation time of the receiver unit or "time to good data" is generally longer than the activation time of the controller, even if the latter has to be woken up from stop mode and not just from pseudo stop mode. This significantly reduces the mean power input.

Even if the activation time of the receiver unit has expired, the controller has, during the time span in which sampling of the signal supplied by the receiver unit has to be performed for a pre-specified time span, to be switched from pseudo stop mode to an active mode only for those short periods in which the processor is processing the command or commands for the individual sampling processes. If no signal to be evaluated is detected, then the processor and the receiver unit are then reset to sleep mode.

BRIEF DESCRIPTION OF THE DRAWINGS

The invention is described in detail below with reference to an exemplary embodiment shown in the drawing, in which.

DETAILED DESCRIPTION OF THE PREFERRED EMBODIMENTS

Figure 1:
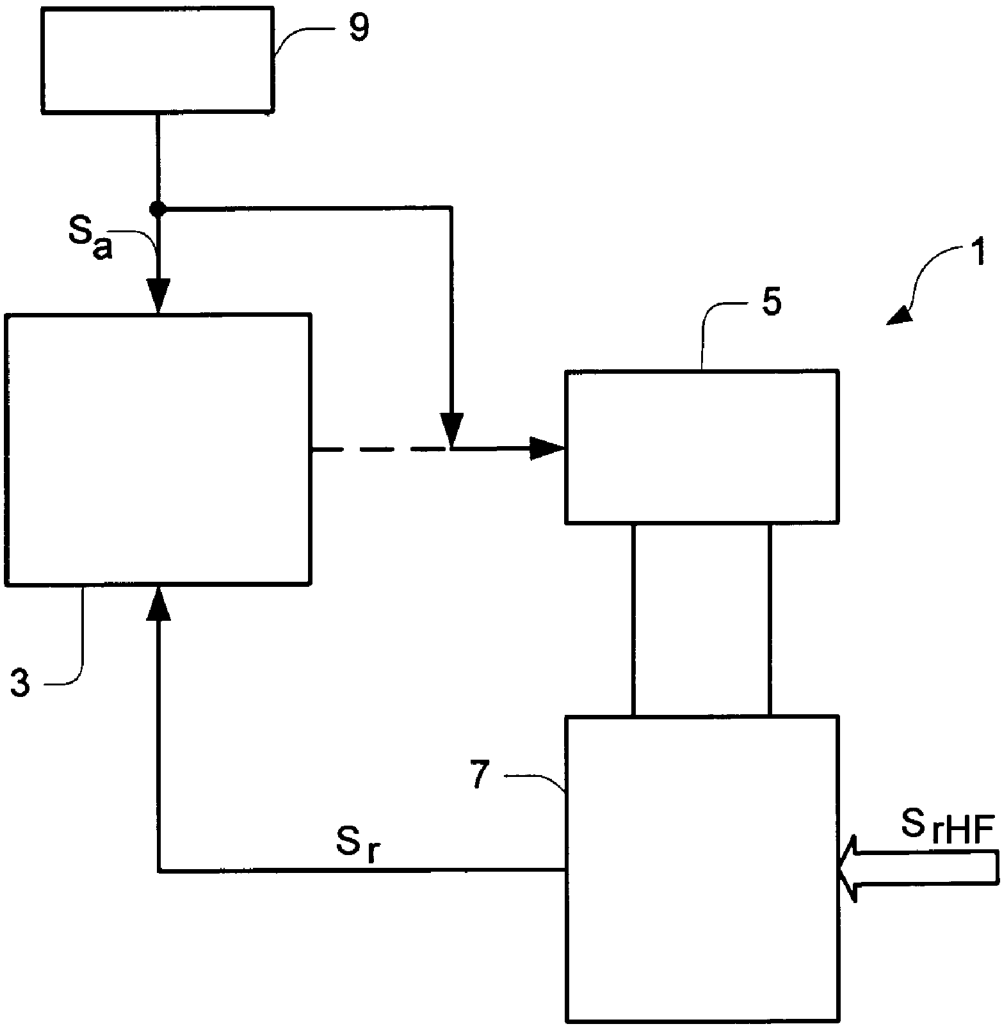
FIG. 1 shows a schematic block diagram of a receiving device according to the invention.

The receiving device 1 shown in FIG. 1 comprises a controller 3 and a power supply unit 5 for a receiver unit 7. An activation control signal $S_a$ can be fed to the controller 3 from an external timer unit 9. The activation control signal $S_a$ is simultaneously fed to the power supply unit 5 so that the activation process for activating the controller 3 and the receiver unit 7 is started simultaneously. The power supply unit 5 can for this purpose have a switch controllable by the signal $S_a$.

The receiver unit 7 which optionally receives a high-frequency receive signal $S_{rHF}$ fed to it, supplies after activation a corresponding receive signal $S_r$ to an input of the controller 3.

Figure 2:
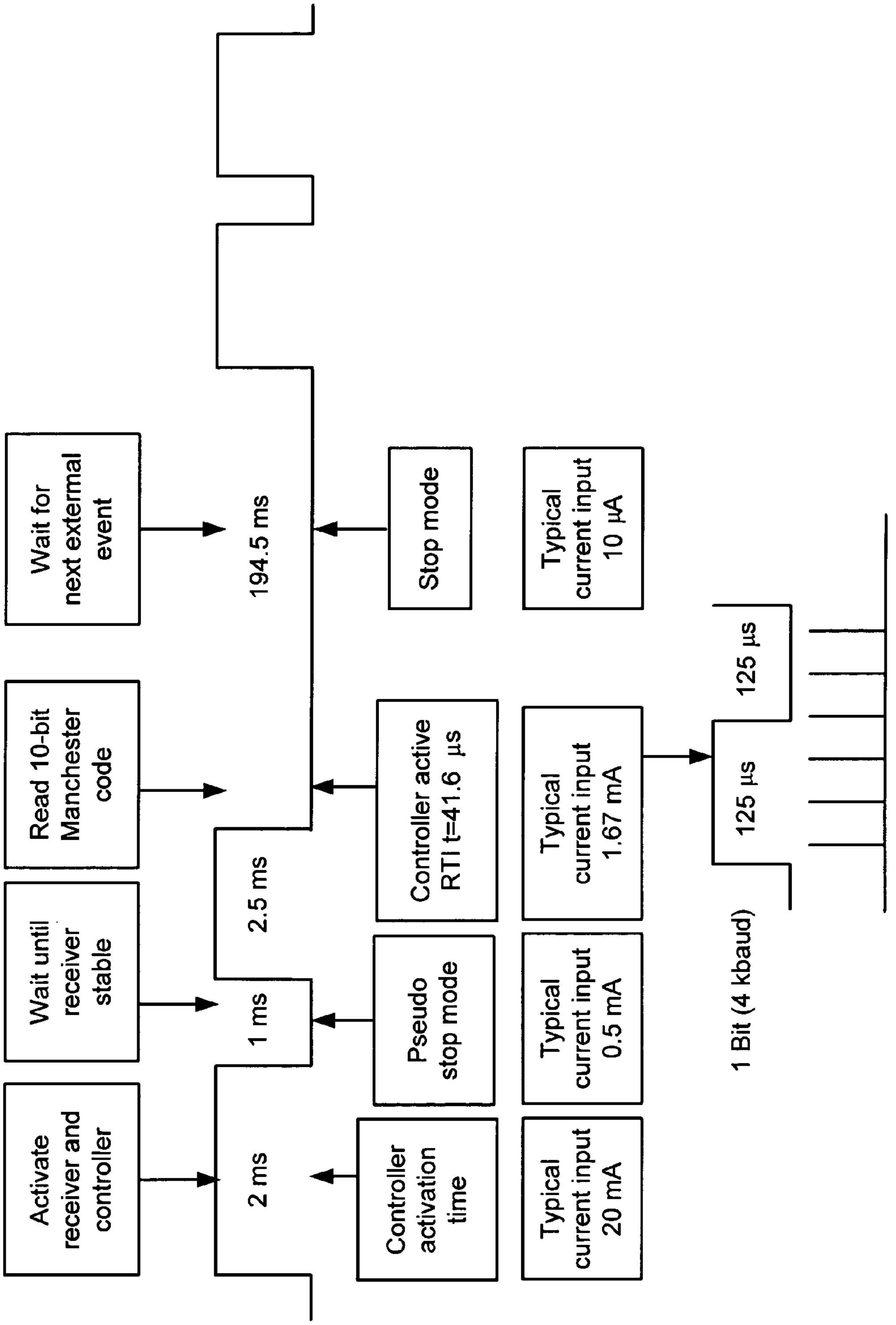
FIG. 2 shows a schematic timing diagram of a first embodiment of the method according to the invention and FIG. 3 shows a schematic timing diagram of a second embodiment of the method according to the invention.

The mode of operation of the receiving device is described below in FIG. 1 in a first alternative with reference to the timing diagram in FIG. 2; the numerical values specified apply to a specific typical embodiment of a controller and a receiver unit:

The controller 3 is woken from stop mode by means of a pulse of the activation control signal $S_a$, said pulse not being shown here. In stop mode, the current input of the controller is e.g. 10 μA and in active mode 20 mA. The activation time for waking the controller 3 from stop mode is typically 1.3 ms, up to a maximum of 2 ms. For this reason, the controller can, as shown in FIG. 2, after expiration of 2 ms be reset to pseudo stop mode, in which the current input is approx. 0.5 mA.

After expiration of 3 ms in total, it is guaranteed that the receiver unit 7 will supply valid data (the "time to good data" is 3 ms). Consequently, the signal $S_r$ can be sampled by the controller 3 in the next phase.

In the example shown, the signal $S_a$ has a baud rate of 4 kbaud and is transmitted by means of the Manchester code. This results in a bit duration of 250 μs, whereby each bit of the Manchester code consists of two half-bits, each with a duration of 125 μs.

In order to sample the signal, the sampling frequency is selected so that each bit is sampled with six sampling values, i.e. the sampling frequency is 24 kHz. If the controller is operated with a clock frequency of 4 MHz, then the instruction time is 0.25 μs. With a mean instruction cycle duration of 10 cycles, this then gives a length of time of 2.5 μs for reading in and evaluating a sampling value.

In order to sample a bit, the processor has consequently to be brought $t=6\times2.5$ μs=15 μs into active mode. In the example shown, it is assumed that 10 bits with an overall duration of 2.5 ms be sampled in order to determine whether there is a valid receive signal (expected bit rate, where applicable expected code). Thus the controller must, at the selected sampling frequency of 24 kHz, be switched every 41.66 μs to active mode, 60 times in total. The result during this period of time of 2.5 ms is a mean current input of 1.67 mA.

If an activation control signal with a period length of 200 ms for the cyclical startup and execution of a test operation "Is there a valid receive signal $S_a$?" is used, then this gives for the example shown a mean current input for the controller 3 of 233 μA. Together with the mean current input of the external timer unit 9 of 85 μA and of the receiver unit 7 of 165 μA, this gives a total mean current input of 484 μA. This is significantly below the threshold of 1 mA normally required.

In place of the external timer unit 9 shown in FIG. 1, a controller-internal timer unit (not shown) can also be used in order to control the power supply unit 5 for the receiver unit 7 (shown dotted in FIG. 1). In this case, however, the controller 3 can no longer be set to stop mode, since the internal timer needs a clock signal. In this variant, the controller can therefore optimally be set to pseudo stop mode.

Figure 3:
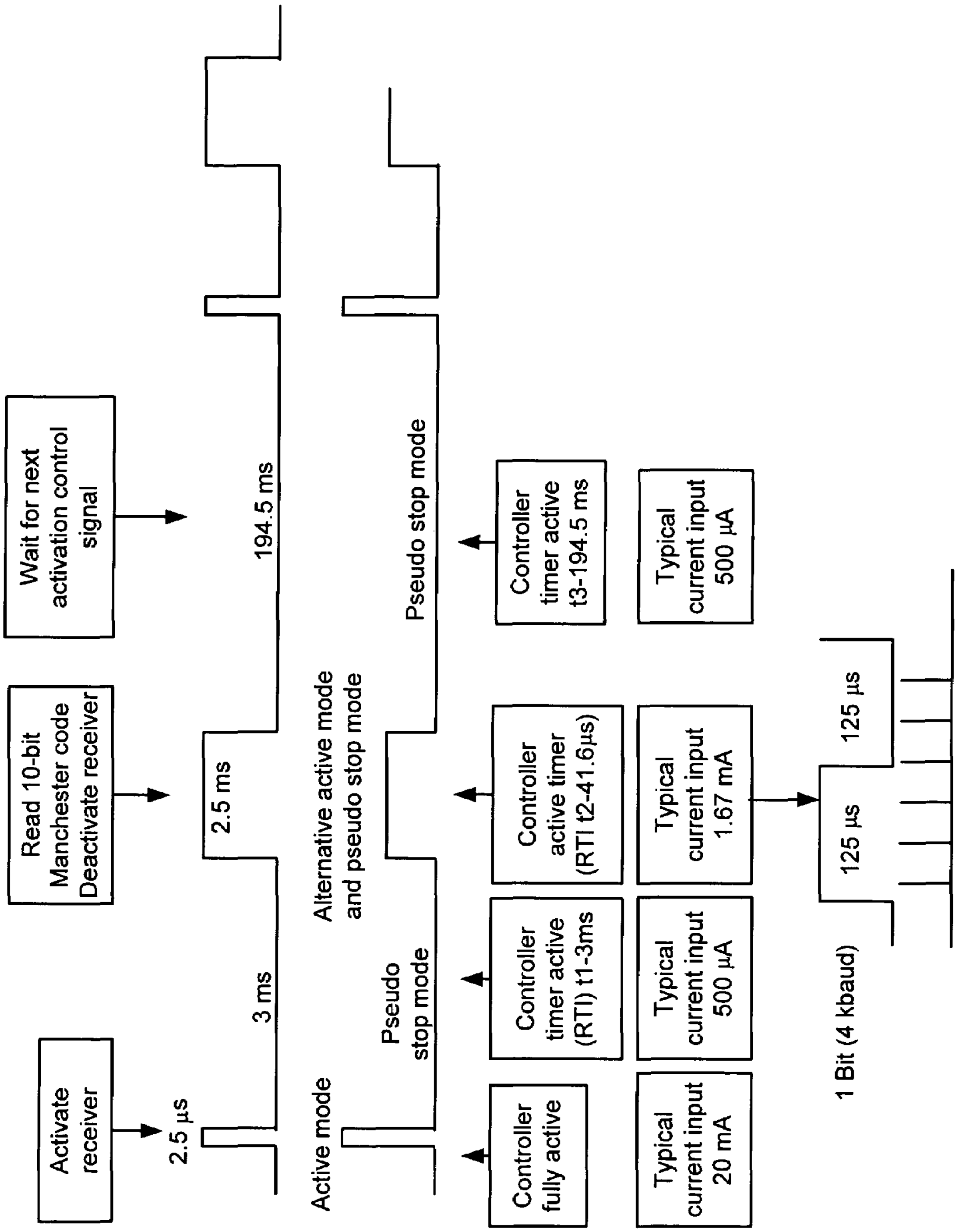

The mode of operation of the receiving device in FIG. 1 in this second alternative is described with reference to the timing diagram in FIG. 3:

At the start of a complete cycle (200 ms cycle time) the controller 3 generates an activation control signal (2.5 μs) and feeds this to the power supply unit 5 in order to activate the receiver unit 7. This internal signal serves simultaneously to activate the controller. After the "active run" of the controller 3, during which said controller consumes a current of 20 mA, the controller is reset to pseudo stop mode until expiration of the "time to good data" of the receiver unit 7. The sampling of the receive signal $S_r$ then takes place, as described above for the first alternative, after which the controller is reset to pseudo stop mode until the start of the next cycle.

This variant gives rise to a significantly higher overall mean current input for the controller of 528 μA, but the current input caused by the external timer unit does not apply. Together with the current input by the receiver unit 7 (this also includes the current input of the power supply unit 5), this consequently gives a total mean current input of 693 μA. This is still significantly below the required value of 1 mA. Moreover, the circuit-engineering outlay for the external timer unit does not apply in this variant.

The invention claimed is:

1. A method for the power-saving control of a receiving device, in particular for an access control system for an automobile, comprising the steps:

a) ascertaining in an inquiry mode in response to a control signal whether a receive signal to be processed is supplied by a receiver unit of the receiving device to a controller of the receiving device, b) switching the receiver unit and the controller, in response to the control signal, simultaneously from a power-saving sleep mode in each case to an active mode in each case, wherein the controller is, after expiration of the controller activation time, switched to a power-saving quasi sleep mode with a steady-state oscillator, until the receiver-unit activation time has expired and the receiver unit is supplying stable data.

2. A method for the power-saving control of a receiving device, in particular for an access control system for an automobile, comprising the steps:

a) ascertaining in an inquiry mode in response to a control signal whether a receive signal to be processed is supplied by a receiver unit of the receiving device to a controller of the receiving device, b) switching the receiver unit and the controller, in response to the control signal, simultaneously from a power-saving sleep mode in each case to an active mode in each case, wherein the controller, after expiration of the receiver-unit activation time during a predetermined time span, which corresponds to a specified number of bits of a possible receive signal, samples the signal supplied by the receiver unit, preferably at equidistant intervals, wherein in order to record a sampled value, the controller is switched to the active mode and after termination of each sampling operation is returned to the quasi sleep mode.

3. The method according to claim 1, wherein the controller, after expiration of the receiver-unit activation time during a predetermined time span, which corresponds to a specified number of bits of a possible receive signal, samples the signal supplied by the receiver unit, preferably at equidistant intervals, wherein in order to record a sampled value, the controller is switched to the active mode and after termination of each sampling operation is returned to the quasi sleep mode.

4. A method for the power-saving control of a receiving device, in particular for an access control system for an automobile, comprising the steps:

a) ascertaining in an inquiry mode in response to a control signal whether a receive signal to be processed is supplied by a receiver unit of the receiving device to a controller of the receiving device, b) switching the receiver unit and the controller, in response to the control signal, simultaneously from a power-saving sleep mode in each case to an active mode in each case, wherein the control signal is fed to the controller and the receiver unit by means of a controller-internal circuit or as a result of a controller-internal event and the power-saving sleep mode of the controller is a quasi sleep mode of the controller with a steady-state oscillator.

5. A computer program product having program code means which control a receiving device, after loading in a memory of the controller, comprising the steps of:

a) ascertaining in an inquiry mode in response to a control signal whether a receive signal to be processed is supplied by a receiver unit of the receiving device to a controller of the receiving device, b) switching the receiver unit and the controller, in response to the control signal, simultaneously from a power-saving sleep mode in each case to an active mode in each case, wherein the controller is, after expiration of the controller activation time, switched to a power-saving quasi sleep mode with a steady-state oscillator, until the receiver-unit activation time has expired and the receiver unit is supplying stable data.

6. A computer program product having program code means which control a receiving device, after loading in a memory of the controller, comprising the steps of:

a) ascertaining in an inquiry mode in response to a control signal whether a receive signal to be processed is supplied by a receiver unit of the receiving device to a controller of the receiving device, b) switching the receiver unit and the controller, in response to the control signal, simultaneously from a power-saving sleep mode in each case to an active mode in each case, wherein the controller, after expiration of the receiver-unit activation time during a predetermined time span, which corresponds to a specified number of bits of a possible receive signal, samples the signal supplied by the receiver unit, preferably at equidistant intervals, wherein in order to record a sampled value, the controller is switched to the active mode and after termination of each sampling operation is returned to the quasi sleep mode.

7. The computer program product having program code means according to claim 5, wherein the controller, after expiration of the receiver-unit activation time during a predetermined time span, which corresponds to a specified number of bits of a possible receive signal, samples the signal supplied by the receiver unit, preferably at equidistant intervals, wherein in order to record a sampled value, the controller is switched to the active mode and after termination of each sampling operation is returned to the quasi sleep mode.

* * * * *